United States Patent
Ramasamy et al.

(10) Patent No.: US 11,409,502 B2
(45) Date of Patent: Aug. 9, 2022

(54) INTELLIGENT CONTROLS FOR END-USER COMPUTING

(71) Applicant: BANK OF AMERICA CORPORATION, Charlotte, NC (US)

(72) Inventors: Suki Ramasamy, Tamil Nadu (IN); Raghavendra Veerupakshappa, Telangana (IN); Samson Paulraj, Telangana (IN); Balasubramanian Bagavathiappan, Tamil Nadu (IN); Timothy Krak, Huntersville, NC (US); Scott B. Desalvo, Cumberland, RI (US); Santanu Sarkar, Fort Mill, SC (US); Nikhil Ram, Huntersville, NC (US); Karrie A. Loatman, Hockessin, DE (US); Joshua C. Wolfe, Lincoln University, PA (US); Gina L. Tammelleo, Lancaster, SC (US); Garima Dhir, Delhi (IN); Kavitha Ganapathi Raman, Charlotte, NC (US); Phillip Matt Hancock, Charlotte, NC (US); Kenneth William Schmidt, Jr., Charlotte, NC (US); Cynthia D. Adams, Charlotte, NC (US); Christophe M. Marin, London (GB)

(73) Assignee: BANK OF AMERICA CORPORATION, Charlotte, NC (US)

( * ) Notice: Subject to any disclaimer, the term of this patent is extended or adjusted under 35 U.S.C. 154(b) by 757 days.

(21) Appl. No.: 16/404,019

(22) Filed: May 6, 2019

(65) Prior Publication Data
US 2020/0356870 A1 Nov. 12, 2020

(51) Int. Cl.
*G06F 8/30* (2018.01)
*G06N 5/02* (2006.01)
*G06N 20/00* (2019.01)
*G06K 9/62* (2022.01)
(Continued)

(52) U.S. Cl.
CPC .............. *G06F 8/30* (2013.01); *G06K 9/6215* (2013.01); *G06N 5/025* (2013.01); *G06N 20/00* (2019.01);
(Continued)

(58) Field of Classification Search
CPC .......... G06F 8/30; G06F 9/451; G06F 16/122; G06F 40/18; G06F 40/226; G06F 40/205;
(Continued)

(56) References Cited

U.S. PATENT DOCUMENTS

7,117,430 B2  10/2006  Maguire, III et al.
7,444,584 B1  10/2008  Hobbs
(Continued)

*Primary Examiner* — Keith D Bloomquist
(74) *Attorney, Agent, or Firm* — Moore & Van Allen PLLC; James C. Edwards (57) ABSTRACT

Embodiments of the invention are directed to intelligently and dynamically controlling both changes made within EUC applications and the control rules associated with such changes. A similarity index is calculated/assigned for each data entry field (i.e., cell/intersection) and the controls implemented when a changes to data in the entry fields occurs is based on the similarity index. In other embodiments, a change to data entry fields dynamically prompts analysis of the change based on historical approval and/or denial patterns specific to the EUC application, the data entry field(s) and/or the user of the application. In response to the analysis the control rules may be dynamically updated, and applied to the current change. In other embodiments, inputs, such as reviewer's comments, are the basis for determining a need to update existing controls or add new controls associated with data entry field(s) and the conditions associated therewith are determined and applied.

20 Claims, 7 Drawing Sheets

(51) Int. Cl.
*G06F 9/451* (2018.01)
*G06F 16/11* (2019.01)
*G06F 40/18* (2020.01)
*G06F 40/226* (2020.01)

(52) U.S. Cl.
CPC .......... *G06F 9/451* (2018.02); *G06F 16/122* (2019.01); *G06F 40/18* (2020.01); *G06F 40/226* (2020.01)

(58) Field of Classification Search
CPC .... G06K 9/6215; G06K 9/6267; G06N 5/025; G06N 20/00
See application file for complete search history.

(56) References Cited

U.S. PATENT DOCUMENTS

| | | | |
|---|---|---|---|
| 9,298,687 B2 | 3/2016 | Petrovicky et al. | |
| 9,324,022 B2 | 4/2016 | Williams, Jr. et al. | |
| 9,519,477 B2 | 12/2016 | Champlin-Scharff et al. | |
| 9,772,988 B2 | 9/2017 | Kraynak et al. | |
| 9,928,160 B2 | 3/2018 | Champlin-Scharff et al. | |
| 10,102,241 B2 | 10/2018 | Zorn et al. | |
| 2003/0106040 A1* | 6/2003 | Rubin | G06F 40/18 717/106 |
| 2006/0095833 A1* | 5/2006 | Orchard | G06F 40/18 715/764 |
| 2007/0011211 A1* | 1/2007 | Reeves | G06F 40/194 707/999.203 |
| 2009/0319880 A1* | 12/2009 | Collie | G06F 40/18 715/219 |
| 2010/0174678 A1* | 7/2010 | Massand | G06F 40/194 707/610 |
| 2017/0017897 A1* | 1/2017 | Bugay | G06F 3/0484 |
| 2017/0116171 A1* | 4/2017 | Villard, Jr. | G06F 40/18 |
| 2017/0161249 A1* | 6/2017 | Olkin | G06F 40/205 |
| 2018/0060441 A1* | 3/2018 | Nakao | G06F 16/9535 |
| 2018/0113571 A1* | 4/2018 | Bastide | G06V 10/22 |
| 2019/0102438 A1* | 4/2019 | Murray | G06F 40/109 |

* cited by examiner

INTELLIGENT CONTROLS FOR END-USER COMPUTING

FIELD OF THE INVENTION

The present invention is generally directed to computing and, more specifically, intelligently and dynamically controlling changes made in End-User Computing (EUC) and the control rules associated therewith.

BACKGROUND

End-user Computing (EUC) is used for various different purposes in an enterprise environment. EUC is performed within a myriad of different spreadsheets/silo applications. The computations performed within these applications may be simple application, pivot type calculations or the like.

However, EUC is subject to input, output, calculation and/or implementation perils. Due to the widespread use of EUC throughout an enterprise it is critical that controls are in place to ensure their proper use and mitigate the perils associated their use.

A need exists to develop systems, computer program products, methods or the like for intelligently and dynamically controlling changes made within an EUC application and the control rules associated with changes. By dynamically controlling the changes as the changes occur and dynamically updating control rules the perils associated with the use of EUC applications is mitigated.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, apparatus, methods and/or the like for intelligently and dynamically controlling both changes made within EUC applications and the control rules associated with such changes.

In specific embodiments of the invention, a similarity index is calculated/assigned for each data entry field (i.e., cell or intersection) within an EUC application based on identifying the functions/formulas linked to the data entry fields and assigning a random weight to the operator(s) within the identified functions/formulas. Machine learning is implemented to categorize the data entry fields based on their similarity indexes. When a change occurs to less than all of the data entry fields within a category deemed to include highly similar data entry fields data entry fields an action is warranted. However, when a change occurs to less than all of the data entry fields within a category deemed to include different/highly dissimilar data entry fields no action may be warranted. In this regard, if change(s) are made within an EUC application a dynamic real-time decision is made as to what action needs is warranted to approve/deny the change.

In other specific embodiments of the invention, a change to one or more data entry fields dynamically prompts analysis of the change based on historical approval and/or denial patterns specific to at least one of the EUC application, the data entry field(s) and/or the user of the application. In response to the analysis the control rules may be dynamically updated, and applied to the current change. In some embodiments of the invention, the updated control rules are specific to at least one of the EUC application, the data entry field(s) and/or the user of the application.

In other specific embodiments of the invention, inputs, such as reviewer's comments, are received that define parameters associated with one or more of the data entry fields in the EUC application. Based on the inputs, a need to update existing controls or add new controls associated with one or more of the one or more data entry fields and the conditions (e.g., thresholds) associated therewith are determined and applied.

A system for intelligently controlling End-User Computing (EUC) defines first embodiments of the invention. The system includes a computing platform having a memory and at least one processor in communication with the memory. The system additionally includes an EUC application stored in the memory, executable by the at least one processor and including data entry fields configured for date entries. In addition, the system includes an EUC change control module stored in the memory that is executable (i) by the at least processor and (ii) on top of the EUC application. The EUC change control module includes a first change control sub-module that is configured to, for each data entry field within the EUC application, identify one or more downstream formulas that link to a corresponding entry field, assign a random weight for each operator in the one or more downstream formulas and calculate a similarity index based on the identified downstream formulas and the assigned one or more random weights. The first change control sub-module is further configured to, in response to a change to a value in one or more data entry fields in the EUC application, determine whether a control is necessary based on the similarity index of the one or more entry fields.

In specific embodiments of the system, the first change control sub-module is further configured to implement machine-learning to categorize the data entry fields based on a degree of similarity of the similarity indexes. In such embodiments of the system, each category defines a level of control required in response to a change to less than all values of the data entry field within the category.

In other specific embodiments of the system, the first change control sub-module is further configured to determine whether the control is necessary based on the similarity index of the one or more entry fields, wherein the control includes one or more of (i) a denial of the change, (ii) an alert to a review function, and (iii) a warning to an alert function.

In still further specific of the system the EUC change control module further includes a second change control sub-module configured to, in response to a change to a value in one more data entry fields of the EUC application, analyze the change to determine whether one or more controls associated with the change are acceptable. In such embodiments of the system, the second change control sub-module may be further configured to analyze the change by comparing the change to historical approval and rejections patterns for at least one of (i) the EUC application, (ii) the one or more data entry fields in the EUC application, (iii) a user of the application, (iv) a combination of the EUC application and the user, and (v) a combination of the EUC application, the user and the one or more data entry fields.

In further specific embodiments of the system, the second change control sub-module is further configured to, in response to determining that at least one of the one or more controls associated with the change are unacceptable, dynamically determine and update the at least one of the one or more controls, such that the updated controls are applied to the change. In such embodiments of the system, the at least one updated control is specific to at least one of (i) the EUC application, (ii) the user of the application or a group of users of the application, and (iii) the one or more data entry fields in the application.

In still further specific embodiments of the system, the EUC change control module further includes a third change control sub-module configured to receive inputs defining one or more parameters associated with one or more of the data entry fields in the EUC application, determine at least one of a need to (i) update one or more existing controls or (ii) add new controls associated with one or more of the one or more data entry fields based on the received inputs, determine at least one of first conditions for updating the one or more existing controls or second conditions for the one or more new controls, and at least one of (i) update the one or more existing controls to reflect the determined first conditions, and (ii) implement the one or more new controls in accordance with the second conditions. In such embodiments of the system, the inputs may be reviewer comments associated with a previous review of changes made to one or more data fields in the EUC application.

In further specific embodiments of the system, the third change control sub-module is further configured to implement at least one Neuro-Linguistic Programming (NLP) model to determine an importance of the reviewer comments. In other specific embodiments of the system, the third change control sub-module is further configured to implement the at least one NLP model to learn first conditions for updating the one or more existing controls or second conditions for the one or more new controls.

In still further specific embodiments of the system, the third change control sub-module is further configured to determine at least one of first conditions for updating the one or more existing controls or second conditions for the one or more new controls, wherein at least one of the first conditions and the second conditions include thresholds for triggering at least one of (i) a denial of the change, (ii) an alert to a review function, and (iii) a warning to an alert function. In such embodiments of the system, the third change control sub-module may be further configured to dynamically (i) update the one or more existing controls to reflect the determined first conditions, and/or (ii) implement the one or more new controls.

A computer program product including a non-transitory computer-readable medium defines second embodiments of the invention. The computer-readable medium includes a first set of codes for causing a computer to, for each data entry field within an EUC application (i) identify one or more downstream formulas that link to a corresponding entry field, (ii) assign a random weight for each operator in the one or more downstream formulas, and (iii) calculate a similarity index based on the identified downstream formulas and the assigned one or more random weights. The computer-readable medium additionally includes a second set of codes for causing a computer to, in response to a change to a value in one or more data entry fields in the EUC application, determine whether a control is necessary based on the similarity index of the one or more entry fields.

In specific embodiments of the computer program product the computer-readable medium includes a third set of codes for causing a computer to implement machine-learning to categorize the data entry fields based on a degree of similarity of the similarity indexes, such that each category defines a level of control required in response to a change to less than all values of the data entry field within the category.

In other specific embodiments of the computer program product the computer-readable medium includes a third set of codes for causing a computer to, in response to a change to a value in one more data entry fields of the EUC application, analyze the change to determine whether one or more controls associated with the change are acceptable, wherein analyzing comprises comparing the change to historical approval and rejections patterns for at least one of (i) the EUC application, (ii) the one or more data entry fields in the EUC application, (iii) a user of the application, (iv) a combination of the EUC application and the user, and (v) a combination of the EUC application, the user and the one or more data entry fields.

In still further embodiments of the computer program product the computer-readable medium includes a third set of codes for causing a computer to receive reviewer comments defining one or more parameters associated with one or more of the data entry fields in the EUC application and a fourth set of codes for causing a computer to determine at least one of a need to (i) update one or more existing controls or (ii) add new controls associated with one or more of the one or more data entry fields based on the received inputs. In addition, the computer-readable medium includes a fifth set of codes for causing a computer to determine at least one of first conditions for updating the one or more existing controls or second conditions for the one or more new controls, and a sixth set of codes causing a computer to perform at least one of (i) updating the one or more existing controls to reflect the determined first conditions, and (ii) implement the one or more new controls in accordance with the second conditions.

A computer-implemented method for intelligently controlling End-User Computing (EUC) defines third embodiments of the invention. The method is executed by one or more computing device processors. The method includes, for each data entry field within an EUC application: identifying one or more downstream formulas that link to a corresponding entry field, assigning a random weight for each operator in the one or more downstream formulas, and calculating a similarity index based on the identified downstream formulas and the assigned one or more random weights. The method further includes, in response to a change to a value in one or more data entry fields in the EUC application, determining whether a control is necessary based on the similarity index of the one or more entry fields. In specific embodiments the method further includes implementing machine-learning to categorize the data entry fields based on a degree of similarity of the similarity indexes, wherein each category defines a level of control required in response to a change to less than all values of the data entry field within the category.

Thus, according to embodiments of the invention, which will be discussed in greater detail below, the present invention provides for intelligently and dynamically controlling both data changes made within EUC applications and the control rules associated with such changes. The dynamic nature of the invention means that dynamic updated rules can be applied to a change currently occurring within an EUC application. As such, exposure is mitigated to critical upstream applications/databases that rely on the data in the EUC applications.

The features, functions, and advantages that have been discussed may be achieved independently in various embodiments of the present invention or may be combined with yet other embodiments, further data of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, systems, apparatus, and methods are described in detail below for intelligently and dynamically controlling both changes made within EUC applications and the control rules associated with such changes. The dynamic nature of the invention means that updated controls rules triggered by a current change may be applied, in real-time, to the current change to ensure that the level of control is consistent with the proposed change. As such, the present invention mitigates exposure to upstream critical applications/databases that rely on the data in the EUC applications.

In specific embodiments of the invention, a similarity index is calculated/assigned for each data entry field (i.e., cell or intersection) within an EUC application based on identifying the functions/formulas linked to the data entry fields and assigning a random weight to the operator(s) within the identified functions/formulas. Machine learning is implemented to categorize the data entry fields based on their similarity indexes. When a change occurs to less than all of the data entry fields within a category deemed to include highly similar data entry fields data entry fields an action is warranted. However, when a change occurs to less than all of the data entry fields within a category deemed to include different/highly dissimilar data entry fields no action may be warranted. In this regard, if change(s) are made within an EUC application a dynamic real-time decision is made as to what action needs is warranted to approve/deny the change.

In other specific embodiments of the invention, a change to one or more data entry fields dynamically prompts analysis of the change based on historical approval and/or denial patterns specific to at least one of the EUC application, the data entry field(s) and/or the user of the application. In response to the analysis the control rules may be dynamically updated, and applied to the current change. In some embodiments of the invention, the updated control rules are specific to at least one of the EUC application, the data entry field(s) and/or the user of the application.

In other specific embodiments of the invention, inputs, such as reviewer's comments, are received that define parameters associated with one or more of the data entry fields in the EUC application. Based on the inputs, a need to update existing controls or add new controls associated with one or more of the one or more data entry fields and the conditions (e.g., thresholds) associated therewith are determined and applied.

Figure 1:
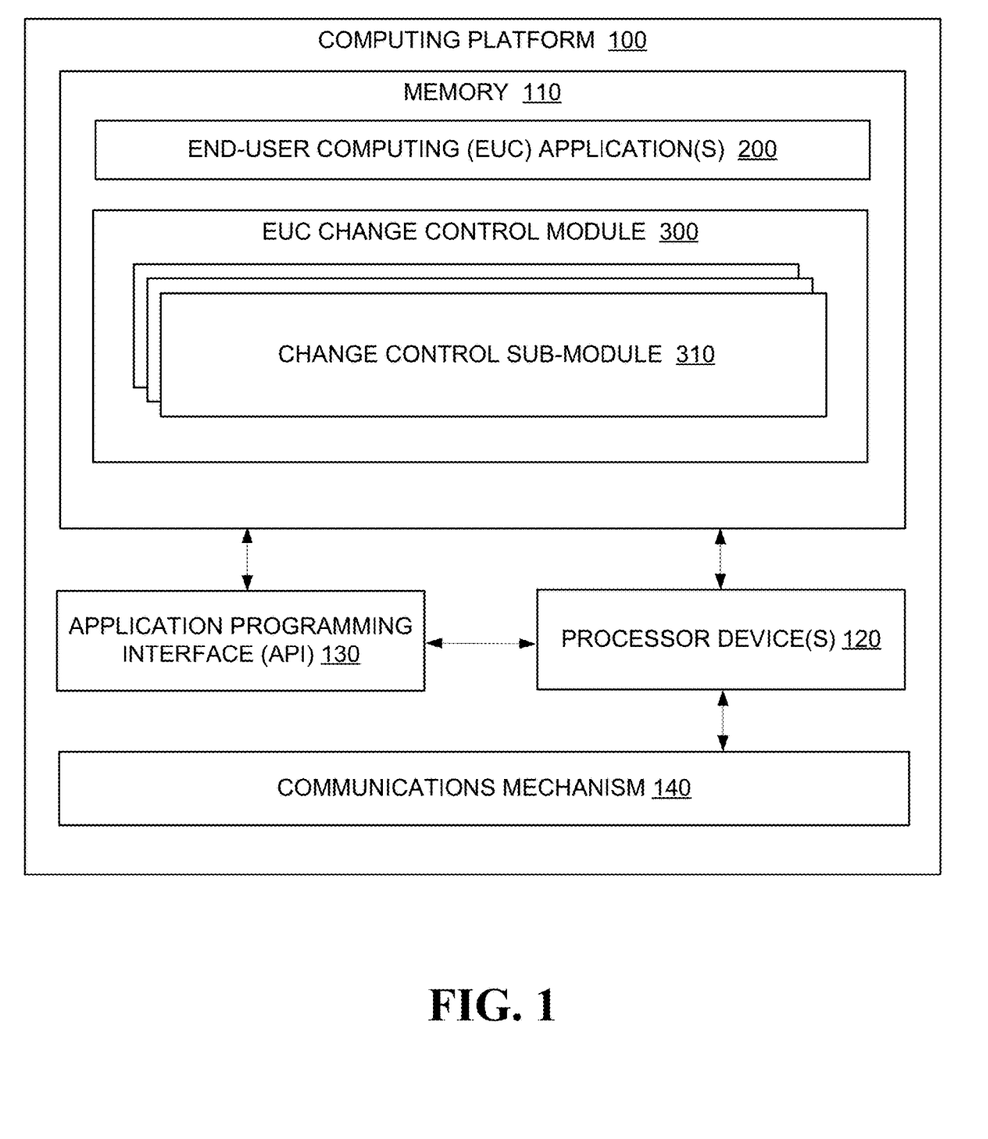
FIG. 1 is a block diagram of a system for intelligently controlling changes and change rules in End-User Computing (EUC) applications, in accordance with some embodiments of the present disclosure.

FIG. 1 illustrates a block diagram of a computing platform 100 for intelligent and dynamic control of changes in End-User Computing (EUC) applications, in accordance with embodiments of the present invention. The computing platform 100 may be embodied in one or more computing devices (e.g., servers, mainframes, storage devices, personal computers (PCs) or the like) capable of executing computer-readable instructions. The computing platform 100 is configured to execute computer-readable instructions, such as algorithms, modules, routines, applications and the like.

Computing platform 100 includes memory 110, which may comprise volatile and non-volatile memory, such as read-only and/or random-access memory (RAM and ROM), EPROM, EEPROM, flash cards, or any memory common to computer platforms). Moreover, memory 110 may comprise cloud storage, such as provided by a cloud storage service and/or a cloud connection service.

Further, computing platform 110 also includes one or more processor devices 120, which may be an application-specific integrated circuit ("ASIC"), or other chipset, logic circuit, or other data processing device. Processor device 120 may execute an application programming interface ("API") 130 that interfaces with any resident instructions, such as End-User Computing (EUC) applications, EUC change control module 300 and sub-modules associated therewith or the like stored in the memory 110 of the computing platform 100.

Processor device(s) 120 may include various processing subsystems (not shown in FIG. 1) embodied in hardware, firmware, software, and combinations thereof, which enable the functionality of the computing platform and the operability of the computing platform on a distributed computing network. For example, processing subsystems allow for initiating and maintaining communications and exchanging data with other networked devices. For the disclosed aspects, processing subsystems of processor device 120 may include any subsystem used in conjunction with EUC application(s) 200 and EUC change control module 300 instructions 610 and related sub-instructions, sub-routines, algorithms, sub-algorithms, modules, sub-modules thereof.

Computing platform 100 may additionally include a communications mechanism 140 embodied in hardware, firmware, software, and combinations thereof, that enables electronic communications between the one or more computing devices of the computing platform 100 computing apparatus 600 and other networks and devices. Thus, communication mechanism 140 may include the requisite hardware, firmware, software and/or combinations thereof for establishing and maintaining a wired and/or wireless network communication connection.

Further, the memory 110 of computing platform 100 stores one or more End-User Computing (EUC) applications 100, such as any known or future known spreadsheet application interactive computer application for organization, analysis and storage of data, typically in tabular form or the like. EUC applications are capable of simple application and/or pivot-type calculations. As its name implies, EUC applications are configured for user manipulation (e.g., a user can change data or perform other functions within the application) and, therefore, exposure is inherent, especially in instances in which the data in the EUC applications is used to make decisions and/or is provided to upstream critical decision-forming applications.

The memory 110 of computing platform 100 additionally stores EUC change control module 300 which is configured to be executed (i) by the processor device(s) 120 and run on top of the EUC application(s) 200 (i.e., acts as the control program to the subordinate EUC application 200). As such, the EUC application 200 and the EUC change control module 300 may be executed on the same device or, in other embodiments of the invention, on separate devices, within a computing cloud and a computing device, separate computing clouds or the like. The EUC change control module 300 is configured to intelligently control changes made within the EUC applications 200, as well as, intelligently control the update and implementation of change control rules governing the changes made within the EUC application(s) 200. The EUC change control module 300 includes a plurality of change control sub-modules 310. In accordance with embodiments of the present invention, each change control sub-module 310 is configured to perform a function associated with controlling a change within an EUC application 200 and/or controlling and implementing updates to change control rules. The sub-modules 310, as described in greater detail below, implement various artificial intelligence (AI) models, neuro-linguistic programming models and/or machine learning techniques to increase the accuracy and efficiency of the change controls over time. While the present application details three specific unique change control sub-modules (310-1, 310-2 and 310-3 described in FIGS. 2-7), those of ordinary skill in the art will recognize that the EUC change control module 300 is configured such that additional change control sub-modules 310 may be added and implemented within the EUC change control module 300.

Figure 2:
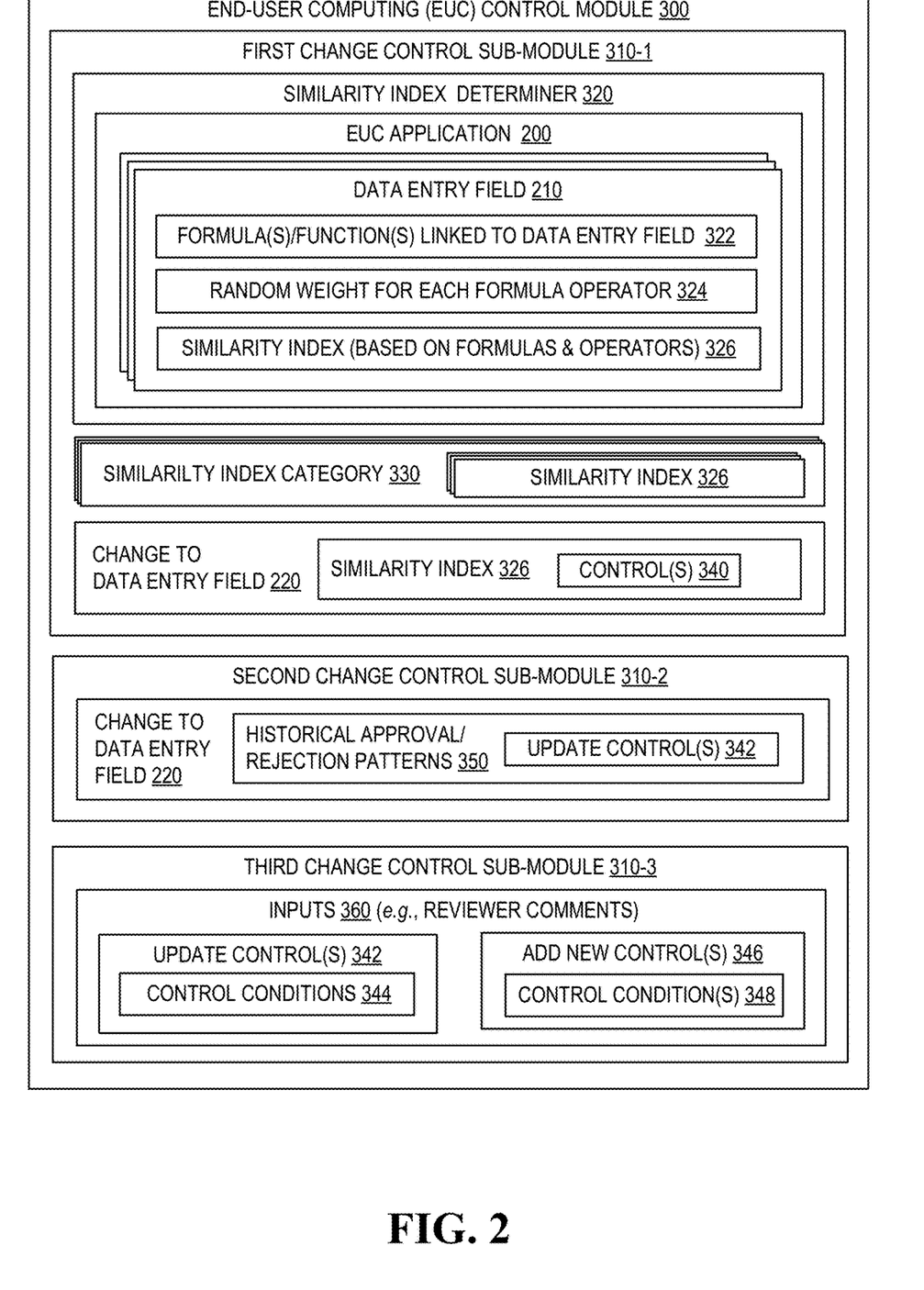
FIG. 2 is a block diagram of a computing platform implementing an EUC change control module, in accordance with embodiments of the present invention.

Referring to FIG. 2, a block diagram is depicted of an EUC change control module 300, highlighting various unique change control sub-modules 310, in accordance with embodiments of the present invention.

EUC change control module 310 includes first change control sub-module 310-1 that is configured to dynamically control changes based on a similarity index, in accordance with embodiments of the present invention. Sub-module 310-1 includes similarity index determiner 320 that is configured to determine/calculate a similarity index for each data entry filed 210 (e.g., cell or intersection) within the EUC application 200. The similarity index determiner is configured to identify the downstream mathematical formula(s)/function(s) 322 that are linked to a corresponding data entry field 210 and apply a random weight (e.g., number) 324 to each operator in the mathematical formula(s)/function(s) 322. Subsequently, a similarity index 326 is determined/calculated for each data entry field 210 based on the linked mathematical formula(s)/function(s) 322 and the applied random weights 324. In response to a change in one or more data entry fields 220, one or more controls are determined and implemented based on the similarity indexes 326 of the data entry fields. The controls may include, but are not limited to, denying the change, alerting a review function, warning/cautioning a review function or the like. In additional embodiments of the invention, machine learning is implemented to place the similarity indexes 326 in similarity index categories 330 and, in response to change in the data fields 220, the similarity categories 330 are the basis for determining what controls are to be implemented. Further details pertaining to the first change control sub-module 310-1 are shown and described in relation to FIGS. 3-5, infra.

In alternate embodiments of the invention, the EUC change control module 310 includes second change control sub-module 310-2 that is configured to dynamically update change control rules based on historical approval/rejection patterns. The second change control sub-module is configured, in response to a change to one or more data entry fields 220, retrieve historical data showing approval/rejection patterns 350 specific to one or more of the EUC application 200, the data entry fields 210 and/or the user 10 or group of users of the EUC application 200. Based on the historical approval/rejection patterns, artificial intelligence models are implemented to determine updated controls 342 specific to one or more of the EUC application 200, the data entry fields 210 and/or the user 10 or group of users of the EUC application 200. The updated controls 342 may include, but are not limited to, denying the change, alerting a review function, warning/cautioning a review function, changing a condition/threshold that triggers denying/alerting/warning or the like. The updated control(s) 342 are dynamically implemented such that the updated controls are implemented on the current change to the data fields 220 (i.e., the change(s) that invoked the historical data and control update).

In further alternate embodiments of the invention, the EUC change control module 310 includes third change control sub-module 310-3 that is configured to dynamically update change controls and/or control conditions based on inputs, such as reviewer's comments, defining one or more parameters associated with one or more of the data entry fields in the EUC application. The third change control sub-module 310-3 is configured to receive the inputs 360, such as reviewer's comments or any other data defining parameters associated with one or more of the data entry fields. For example, other data may come from external data feeds indicating conditions associated with the data entry fields. The inputs 360 are fed into a NLP model to understand a level of importance of the input and identify a need to update controls 342 and the associated control conditions 344 or add new controls 346 and associated control conditions 348. The updated control(s) 342 and conditions 344 and/or new controls 346 and conditions 348 are dynamically implemented, such that, ongoing or next occurring changes to the data entry fields 210 will be subject to the updated control(s) 342 and conditions 344 and/or new controls 346 and conditions 348.

Figure 3:
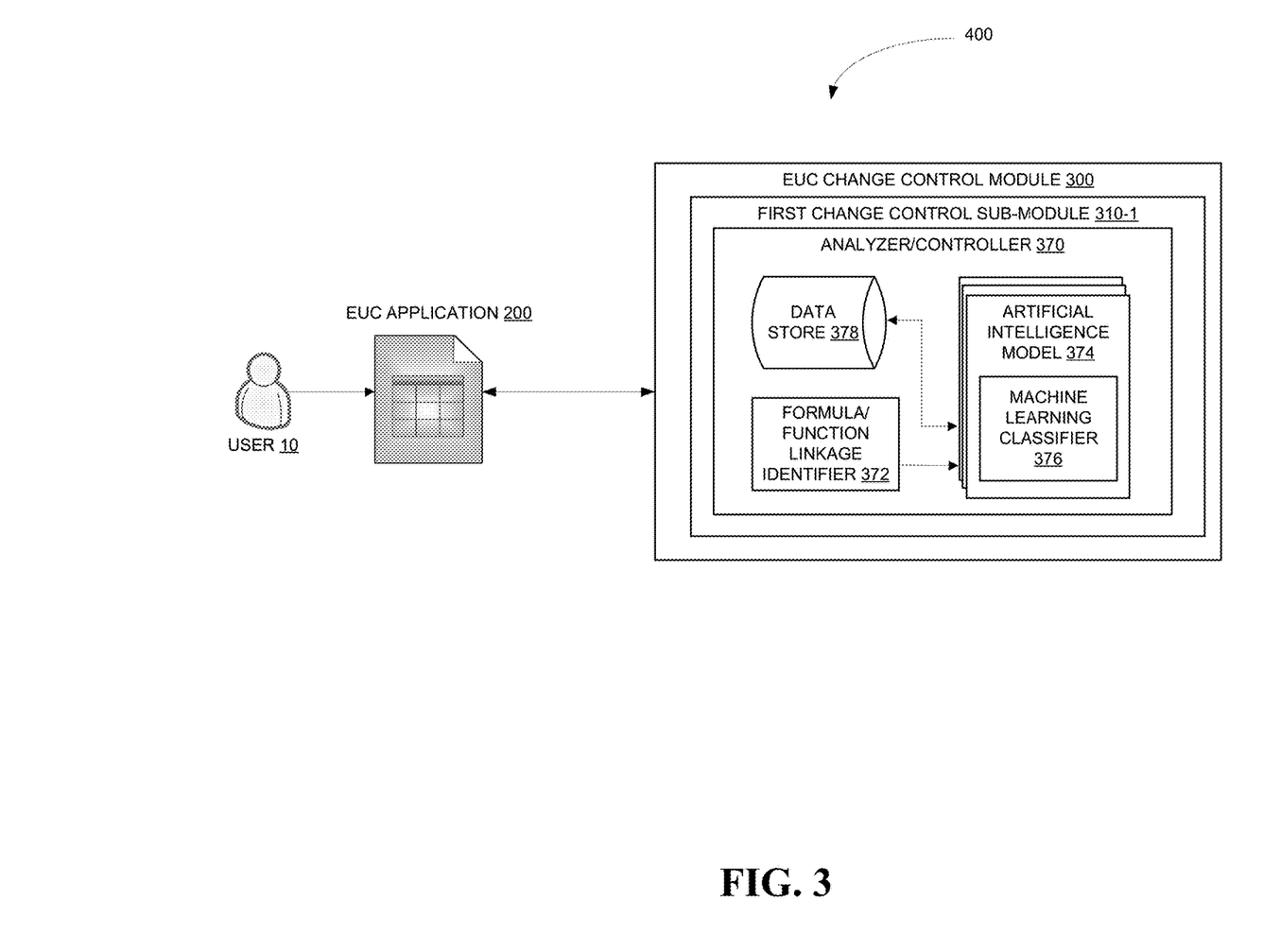
FIG. 3 is a schematic diagram of a system for dynamically and intelligently controlling changes in EUC applications via use of similarity indexes, in accordance with embodiments of the present invention.

Referring to FIG. 3 a schematic diagram is presented of a system 400 for intelligently and dynamically controlling changes to data entry fields in an EUC application based on similarity indexes, in accordance with embodiments of the present invention. The system comprises an EUC application 200 and an EUC change control module 300 that is executed on top of the EUC application. The EUC change control module 300 includes a first change control sub-module 310-1 having an analyzer/controller 370 for determining/calculating similarity indexes and determining, based on the similarity indexes, requisite controls to implement for a change to data entry fields.

The analyzer/controller 370 invokes the formula/function linkage identifier 372 to identify all of the formulas linked to each of the data entry fields (e.g., cells or intersections) within the EUC application 200 and random weights are assigned to each operator in the formulas. It should be noted that the random weight will remain consistent across the same operator throughout all of the formulas linked to the EUC application (e.g., a multiplication operator will be assigned a random weight and each instance of a multiplication operator in all of the formulas linked to EUC application will be assigned the same random weight). The Artificial Intelligence (AI) models 374 are run to calculate similarity indexes for each data entry field (e.g., cells or intersections) within the EUC application 200 based on the linked formulas and the assigned random operator weights. It should be noted that the similarity indexes may be calculated at predetermined intervals, triggered in response to determining that linkages to one or more data entry fields have changed and/or triggered in response to indication of a proposed change to one or more data entry fields. In response to determining the similarity indexes, the Machine Learning (ML) classifier 378 will classify the data entry fields based on their respective similarity indexes. For example, same or highly similar indexes will be provided a first classification, such that a first control (e.g., deny the change, an alert to a review function) is triggered in response to change to some but not all of the data entry fields in the classified set. Further, mostly similar indexes will be provided a second classification, such that a second control (e.g., a warning to a review function) is triggered in response to a change to some but not all of the data entry fields in the classified set. Moreover, different indexes will be provided a third classification, such that no control is triggered in response to a change to some but not all of the data entry fields in the classified set. The similarity indexes and the classifications are stored in data store 378.

In response to user 10 interacting with the EUC application 200 to propose a change to one or more data entry fields, the data store 376 is accessed to retrieve similarity indexes and/or classifications associated with the data entry fields being changed and controls associated with the data entry field(s) classifications are implemented.

Figure 4:
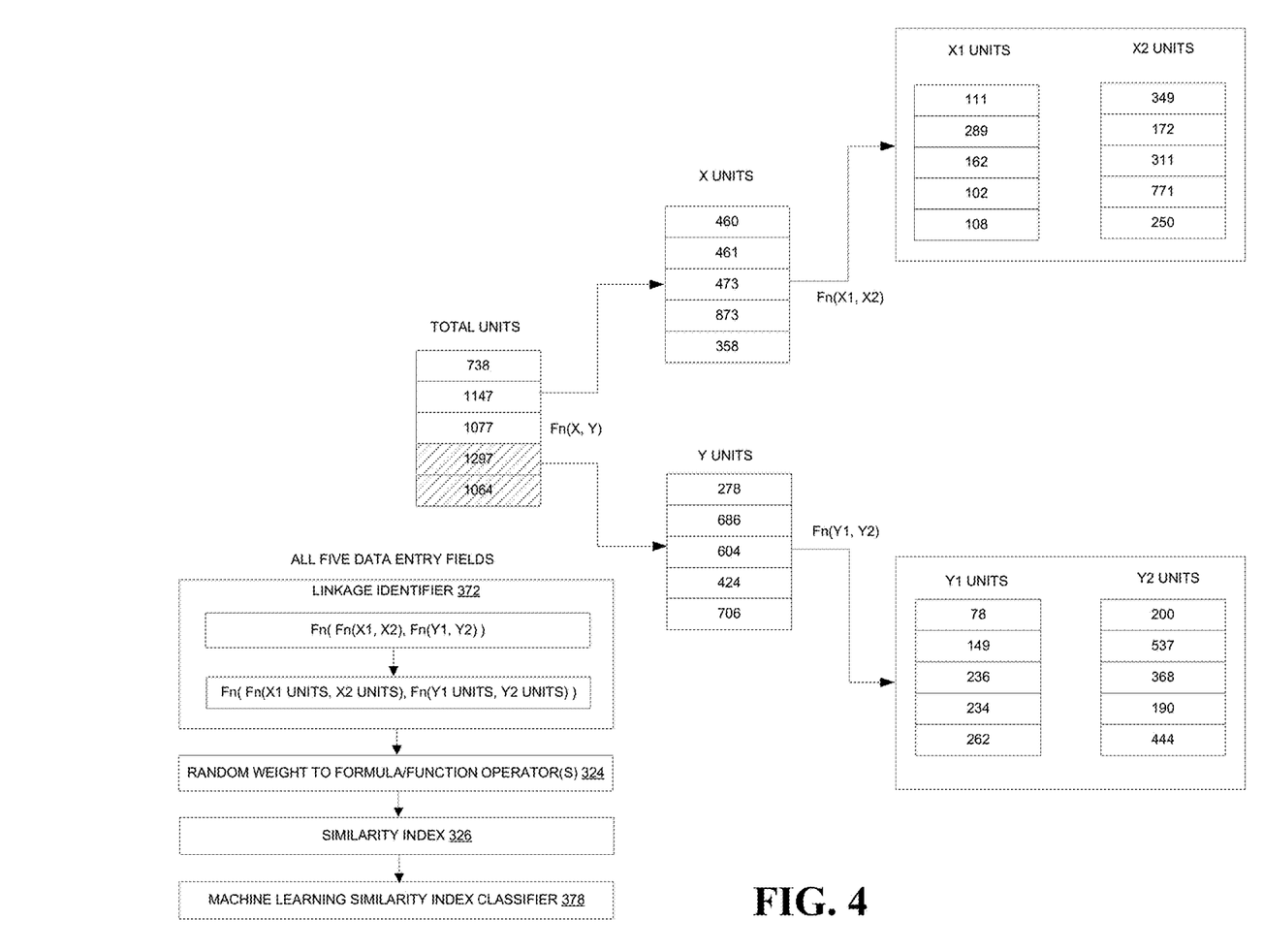
FIG. 4 is a first example of identifying formulas/functions linked to data entry fields and calculating a similarity index, in accordance with embodiments of the present invention.
Figure 5:
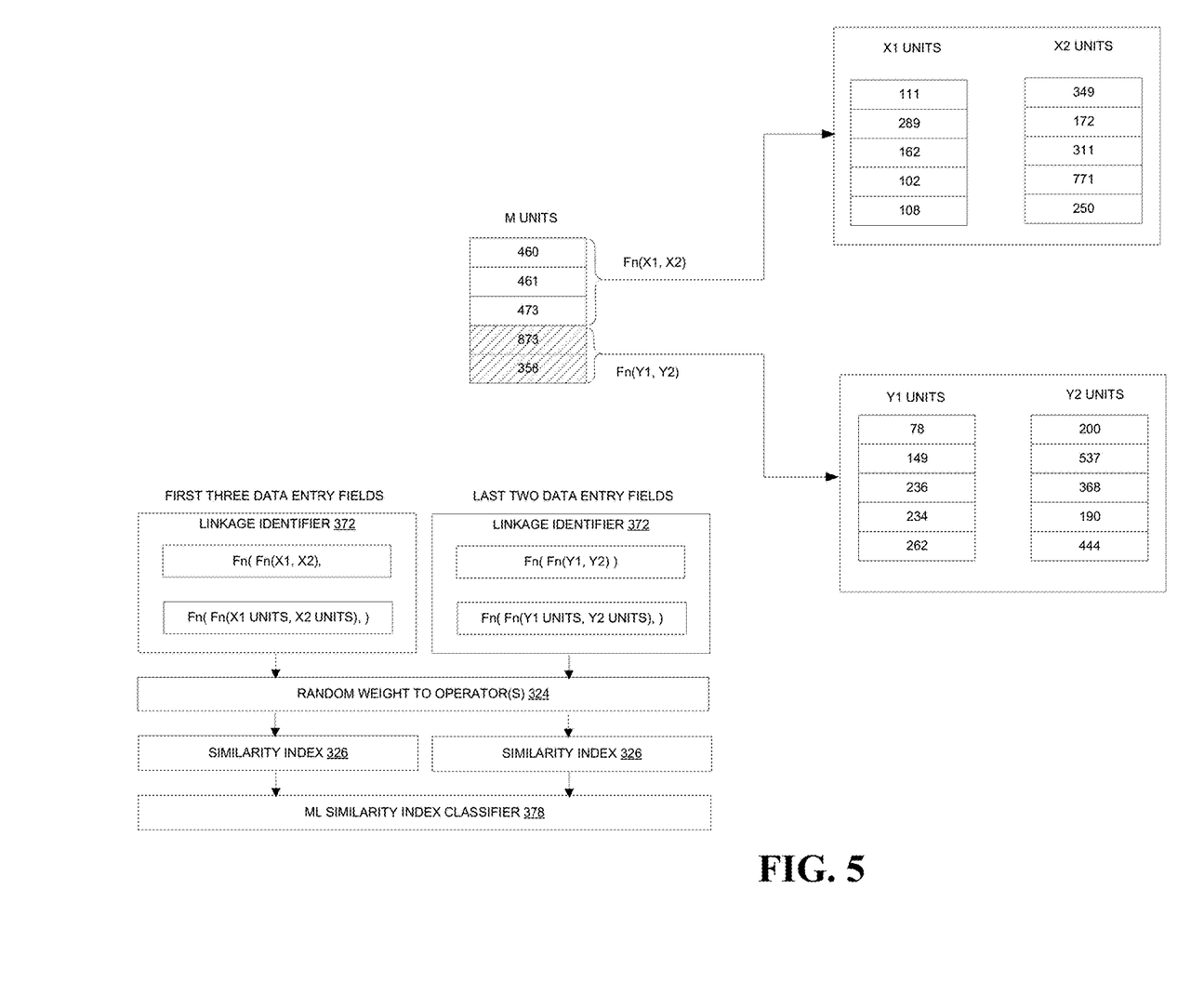
FIG. 5 is a second example of identifying formulas/functions linked to data entry fields and calculating similarity indexes, in accordance with some embodiments of the present disclosure.

Referring to FIGS. 4-5 examples are shown of identifying formulas/functions linked to data entry fields and calculating a similarity index, in accordance with embodiments of the present invention. FIG. 4 provides an example in which all five the data entry fields, shown under the "total units" heading have the same linked formulas; fn(fn(X1, X2), fn(Y1, Y2)) and fn(fn (X1 units, X2 units), fn(Y1 units, Y2 units)) as identified by the linkage identifier 372. In other words, the data entry fields under the "total units" heading are a summation of data entries under the "X units" and "Y units" headings and the data entries under the "X units" and "Y units" headings are a summation of the data entries under the "X1 units" and "X2 units" and "Y1 units" and "Y2 units", respectively. Random weights 324 are applied to each operator in the linked formulas (e.g., each addition operator in the functions will assigned the same random weight) and a similarity index 326 is calculated. Based on the fact that all of the data entry fields under the "total units" heading have the same linked formula, the resulting similarity index will be the same for all of the data entry fields. As such, the machine learning classifier 372 will classify all the entries within the same classification/category; a classification/category that indicates that all of the similarity indexes are the same or highly similar and prompts a first control (e.g., alerting a review function) in response to a change to one or more but not all of the data entry fields in the category/classification set. Thus, in the illustrated embodiment of FIG. 4, in the event proposed changes are attempted for the two highlighted data entry fields under the "total units" heading, a first control (e.g., alerting a review function) associated with the classification set is triggered since some, but not all, of the data field entries within the set have been changed.

FIG. 5 provides an example in which the first three data entry fields and the last two data entry fields under the "M units" heading have different linked formulas. The first three data entry fields are linked to the formulas/functions: fn(fn (X1, X2) and fn(fn(X1 units, X2 units)) and the last two data entry fields are linked to formulas/functions: fn(fn(Y1, Y2) and fn(fn(Y1 units, Y2 units)). Random weights 324 are applied to each operator in the linked formulas and similarity index 326 are calculated. Based on the fact that the first three data entry fields and the last two data entry fields under the "M units" heading have the different linked formula, the resulting similarity index will be different for the first three data field entries and the last two data field entries. As such, the machine learning classifier 372 will classify the first three entries within the one classification/category and the last two entries within another classification category. Each of the categories/classifications indicate that all of the similarity indexes are the same or highly similar and, thus, a change to one or more but not all of the data entry fields in the classification set prompts a first control (e.g., alerting a review function). In addition, all five of the data field entries will be placed in a classification/category that indicates different similarity indexes, such that no control is triggered in response to a change to some but not all of the data entry fields in the classified set. Thus, in the illustrated embodiment of FIG. 5, in the event proposed changes are attempted for the two highlighted data entry fields under the "M units" heading, no control is triggered (e.g., no alert or warning is sent to a review function) since the similarity indexes are different for the first three data field entries and the last two entries and the entries have been classified in a set indicating that no control is triggered.

Figure 6:
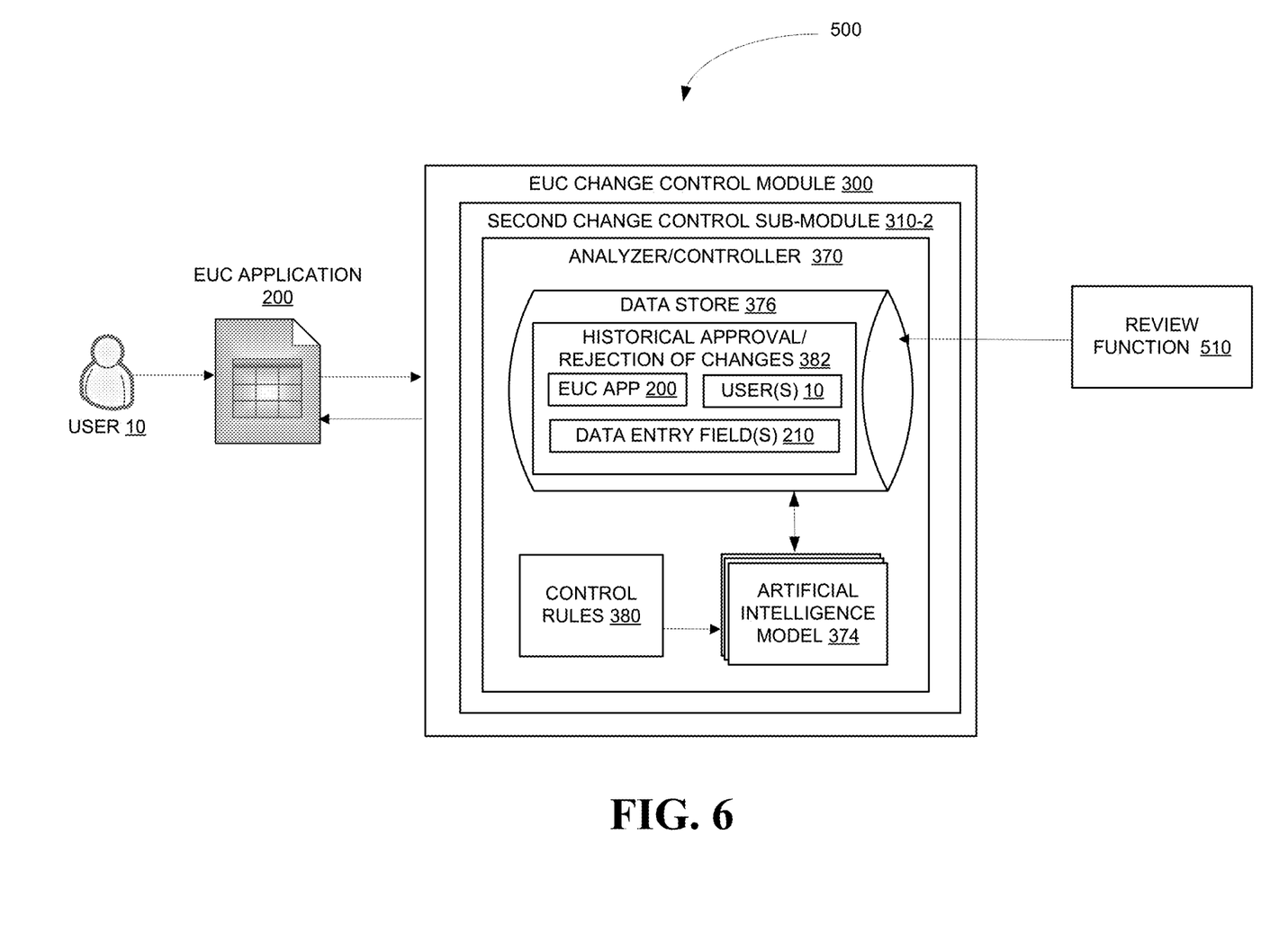
FIG. 6 is schematic diagram of a system for dynamically and intelligently controlling change rules applied to change based on historical approval/denial of change data, in accordance with embodiments of the present invention.

Referring to FIG. 6 a schematic diagram is presented of a system 500 for intelligently and dynamically controlling changes to control rules based on historical approval/rejection rejections patterns, in accordance with embodiments of the present invention. The system comprises an EUC application 200 and an EUC change control module 300 that is executed on top of the EUC application. The EUC change control module 300 includes a second change control sub-module 310-2 having an analyzer/controller 370 for determining updates to change control rules 380 based on historical approval/rejection patterns 382 of previous changes.

A review function 510 submits results of previous change reviews to the second change control sub-module 310-2. The results of the previous review, which may be specific to a user 10, an EUC application 200 and data fields 210 within the EUC application, indicate whether the change was approved or rejected. The review may be automated review based on predetermined review rules or the reviews may be a manual function performed by a reviewer/approver. The results of the previous change reviews are stored in data store 376 as historical approval/rejection of changes data 382

In response to a proposed change to one or more data entry fields within an EUC application the changes are submitted to the second change control sub-module 310-2, and the data store is accessed to retrieve historical approval/ rejection of changes data 382 specific to at least one of the EUC application 200, the user 10 (or user group associated with the user) and the data entry fields 210 being changed. The data 382 is applied to the Artificial Intelligence (AI) models to determine historical approval or rejection patterns specific to at least one and, in some embodiments of the system, combinations of the data entry field(s), the EUC application and/or the user (or user group). In response to determining historical approval or rejection patterns the control rules 380 are dynamically updated and applied, in real-time, to the proposed change being made within the EUC application 200. The updated control rules may be specific to at least one and, in some embodiments of the system, combinations of the data entry field(s), the EUC application and/or the user (or user group). The updated control may reflect an increase in the control (e.g., previously no control currently a warning, previously a warning currently an alert or the like) or decrease in the control (e.g., previously an alert currently a warning, previously a warning currently no control (i.e., change approved without action/review) or the like). In specific embodiments of the system 500 the updated control rule may be a one-time only update to the control rule (i.e., the updated controls are only applied to the current proposed change), while in other embodiments the updated control rule may be a permanent update and stored in the data store 376 for future use.

Figure 7:
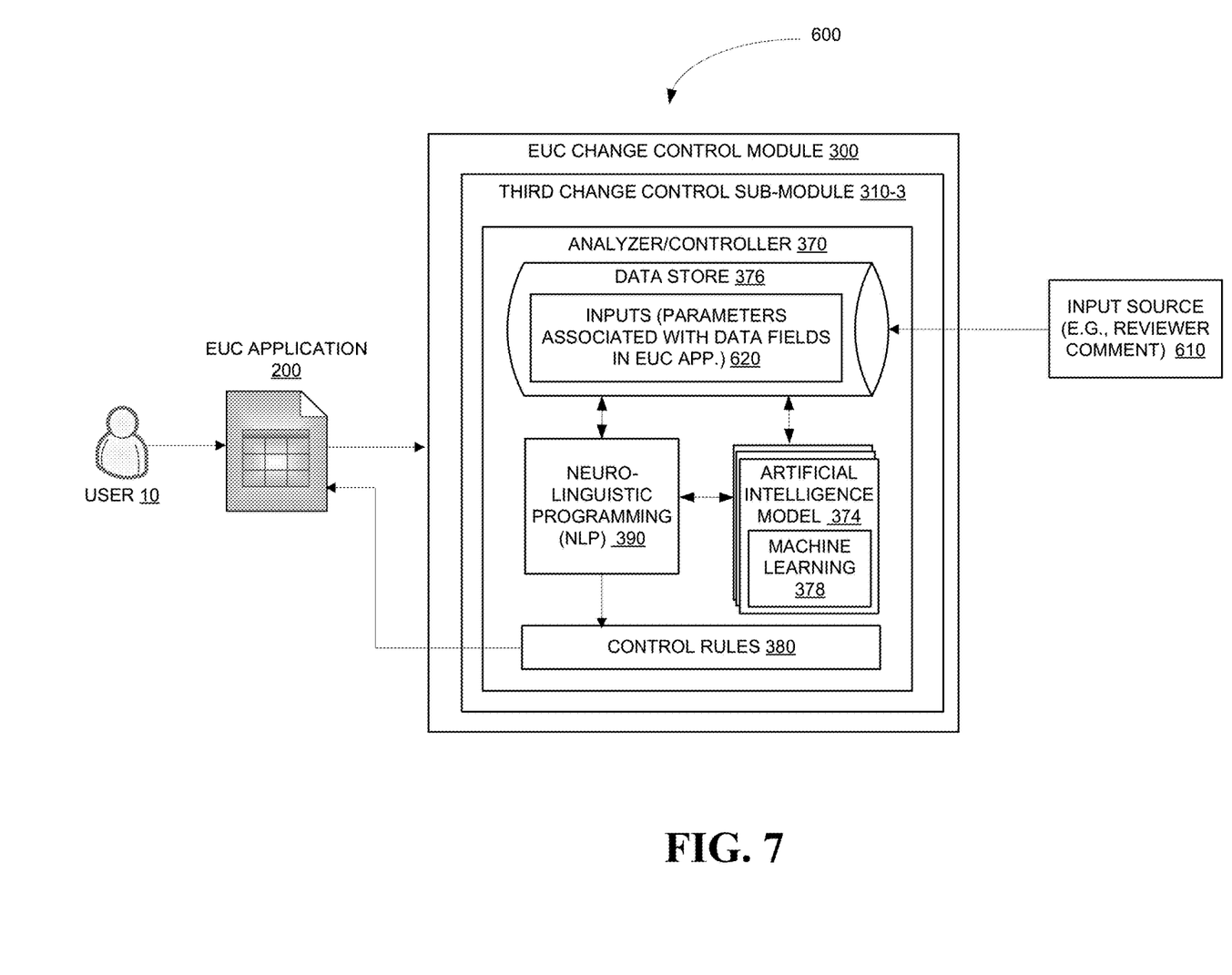
FIG. 7 is schematic diagram of a system for dynamically and intelligently controlling change rules applied to change based on inputs (e.g., reviewer's comments associated with previous review), in accordance with embodiments of the present invention.

Referring to FIG. 7 a schematic diagram is presented of a system 600 for intelligently and dynamically controlling changes to control rules for an EUC application based on inputs defining parameters associated with data entry fields in the EUC application, in accordance with embodiments of the present invention. The system comprises an EUC application 200 and an EUC change control module 300 that is executed on top of the EUC application 200. The EUC change control module 300 includes a third change control sub-module 310-3 having an analyzer/controller 370 for determining updates to change control rules 380 based on inputs 610, such as reviewer comments, that define parameters associated with data entry fields 210 in the EUC application 200.

The inputs 620 are received from an input source 610. In specific embodiments of the invention, the input source 610 may be a reviewer dashboard application, in which a reviewer (e.g., manual or automated) provides a comments or the like as part of the process for approving or rejecting a change to one or more data fields in the EUC application 200 (e.g., approving/rejecting a change in response to receiving an change alert or the like). The inputs 620 are received and stored within the data store 376 of the change control sub-module 310-1.

The inputs 376 are received by the NLP model 390 to understand the importance of the inputs (i.e., identify the relevant filed heading of the input/comment) and how it pertains to data entry fields and the change control conditions (e.g., thresholds or the like that trigger an action, such as a warning or alert). Further, the NLP model 390, in conjunction with Machine Learning (ML) model 378 in the AI models 374, learn, over time, to identify new and/or updated control fields and the conditions associated therewith and dynamically apply the updated or new controls to the control rules 380. Specifically the ML model 378 will use the statistics associated with the inputs 376 currently residing in the data store 376 (i.e., the historical data) to propose new conditions to existing control rules and/or new control rules and conditions. The dynamic nature of the updated conditions and/or new control rules means that the updated conditions and/or new rules are implemented on currently proposed changes to data entry fields.

For example, in specific embodiment, an initial control for one or more data entry fields may require the communication of an alert in the event that the value exceeds 1000. However, historical inputs, such as comments from reviewers (e.g., manual or automated) in response to receiving such alerts indicate approval of such data field entry when the value is within 1% of the threshold value of 1000 and external conditions observed or otherwise known by the reviewer are determined to "good". In such, instances the NLP model 390 is configured to learn, over time, that if the external condition is aligned with the condition in the inputs (e.g., external condition is "good"), then the threshold value of 1000 can be lowered to 990. In other words, if the external condition is "good", communication of an alert will be triggered if the value in the data entry field is changed to a value that exceeds 990

Thus, present embodiments of the invention, including systems, apparatus, methods and/or the like, provide for intelligently and dynamically controlling data entry filed changes within EUC applications. In specific embodiments the present invention changes to data entry fields are controlled based a similarity index that provides for how similar one data entry field is to other data entry fields based on corresponding linkages to downstream formulas. Additionally, by implementing the controls proposed herein the present invention increases the accuracy and efficiency, over time, by employing self-learning based on historical approvals and/or external inputs, such as reviewer comments and the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for intelligently controlling End-User Computing (EUC), the system comprising:
    a computing platform including a memory and at least one processor in communication with the memory;
    an EUC application stored in the memory, executable by the at least one processor and including data entry fields configured for date entries; and
    an EUC change control module stored in the memory, executable by the at least processor and on top of the EUC application and comprising:
        a first change control sub-module configured to:
            for each data entry field within the EUC application:
                identify one or more downstream formulas that link to a corresponding entry field,
                assign a random weight for each operator in the one or more downstream formulas,
                Calculate a similarity index based on the identified downstream formulas and the assigned one or more random weights, and
            in response to a change to a value in one or more data entry fields in the EUC application, determine whether a control is necessary based on the similarity index of the one or more entry fields.

2. The system of claim 1, wherein the first change control sub-module is further configured to implement machine-learning to categorize the data entry fields based on a degree of similarity of the similarity indexes.

3. The system of claim 2, wherein the first change control sub-module is further configured categorize the entry fields such that each category defines a level of control required in response to a change to less than all values of the data entry field within the category.

4. The system of claim 1, wherein the first change control sub-module is further configured to determine whether the control is necessary based on the similarity index of the one or more entry fields, wherein the control includes one or more of (i) a denial of the change, (ii) an alert to a review function, and (iii) a warning to an alert function.

5. The system of claim 1, wherein the EUC change control module further comprises a second change control sub-module configured to:
    in response to a change to a value in one more data entry fields of the EUC application,
    analyze the change to determine whether one or more controls associated with the change are acceptable.

6. The system of claim 5, wherein the second change control sub-module is further configured to analyze the change by comparing the change to historical approval and rejections patterns for at least one of (i) the EUC application, (ii) the one or more data entry fields in the EUC application, (iii) a user of the application, (iv) a combination of the EUC application and the user, and (v) a combination of the EUC application, the user and the one or more data entry fields.

7. The system of claim 5, wherein the second change control sub-module is further configured to, in response to determining that at least one of the one or more controls associated with the change are unacceptable, dynamically determine and update the at least one of the one or more controls, such that the updated controls are applied to the change.

8. The system of claim 7, wherein the second change control sub-module is further configured to determine and update the at least one of the one or more controls, such that the updated controls are applied to the change, wherein the at least one updated control is specific to at least one of (i) the EUC application, (ii) the user of the application or a group of users of the application, and (iii) the one or more data entry fields in the application.

9. The system of claim 1, wherein the EUC change control module further comprises a third change control sub-module configured to:
receive inputs defining one or more parameters associated with one or more of the data entry fields in the EUC application;
determine at least one of a need to (i) update one or more existing controls or (ii) add new controls associated with one or more of the one or more data entry fields based on the received inputs;
determine at least one of first conditions for updating the one or more existing controls or second conditions for the one or more new controls; and
at least one of (i) update the one or more existing controls to reflect the determined first conditions, and (ii) implement the one or more new controls in accordance with the second conditions.

10. The system of claim 9, wherein the third change control sub-module is further configured to receive the inputs, wherein the inputs are reviewer comments associated with a previous review of changes made to one or more data fields in the EUC application.

11. The system of claim 10, wherein the third change control sub-module is further configured to implement at least one Neuro-linguistic programming model to determine an importance of the reviewer comments.

12. The system of claim 10, wherein the third change control sub-module is further configured to implement at least one Neuro-linguistic programming model to learn first conditions for updating the one or more existing controls or second conditions for the one or more new controls.

13. The system of claim 9, wherein the third change control sub-module is further configured to determine at least one of first conditions for updating the one or more existing controls or second conditions for the one or more new controls, wherein at least one of the first conditions and the second conditions include thresholds for triggering at least one of (i) a denial of the change, (ii) an alert to a review function, and (iii) a warning to an alert function.

14. The system of claim 9, wherein the third change control sub-module is further configured to dynamically (i) update the one or more existing controls to reflect the determined first conditions, and (ii) implement the one or more new controls.

15. A computer program product comprising:
a non-transitory computer-readable medium comprising:
a first set of codes for causing a computer to, for each data entry field within an EUC application (i) identify one or more downstream formulas that link to a corresponding entry field, (ii) assign a random weight for each operator in the one or more downstream formulas, and (iii) calculate a similarity index based on the identified downstream formulas and the assigned one or more random weights; and
a second set of codes for causing a computer to, in response to a change to a value in one or more data entry fields in the EUC application, determine whether a control is necessary based on the similarity index of the one or more entry fields.

16. The computer program product of claim 15, further comprising:
a third set of codes for causing a computer to implement machine-learning to categorize the data entry fields based on a degree of similarity of the similarity indexes, wherein each category defines a level of control required in response to a change to less than all values of the data entry field within the category.

17. The computer program product of claim 15, further comprising:
a third set of codes for causing a computer to, in response to a change to a value in one more data entry fields of the EUC application, analyze the change to determine whether one or more controls associated with the change are acceptable, wherein analyzing comprises comparing the change to historical approval and rejections patterns for at least one of (i) the EUC application, (ii) the one or more data entry fields in the EUC application, (iii) a user of the application, (iv) a combination of the EUC application and the user, and (v) a combination of the EUC application, the user and the one or more data entry fields.

18. The computer program product of claim 15, further comprising:
a third set of codes for causing a computer to receive reviewer comments defining one or more parameters associated with one or more of the data entry fields in the EUC application;
a fourth set of codes for causing a computer to determine at least one of a need to (i) update one or more existing controls or (ii) add new controls associated with one or more of the one or more data entry fields based on the received inputs;
a fifth set of codes for causing a computer to determine at least one of first conditions for updating the one or more existing controls or second conditions for the one or more new controls; and
a sixth set of codes causing a computer to perform at least one of (i) updating the one or more existing controls to reflect the determined first conditions, and (ii) implement the one or more new controls in accordance with the second conditions.

19. A computer-implemented method for intelligently controlling End-User Computing (EUC), the method executed by one or more computing device processors and comprising:
for each data entry field within an EUC application:
identifying one or more downstream formulas that link to a corresponding entry field,
assigning a random weight for each operator in the one or more downstream formulas,
calculating a similarity index based on the identified downstream formulas and the assigned one or more random weights; and
in response to a change to a value in one or more data entry fields in the EUC application, determining whether a control is necessary based on the similarity index of the one or more entry fields.

20. The computer-implemented method of claim 19, further comprising implementing machine-learning to categorize the data entry fields based on a degree of similarity of the similarity indexes, wherein each category defines a level of control required in response to
a change to less than all values of the data entry field within the category.

* * * * *